US011996218B2

(12) United States Patent
Paalhorn et al.

(10) Patent No.: US 11,996,218 B2
(45) Date of Patent: May 28, 2024

(54) SURGE ARRESTER WITH A WINDING DESIGN, AND METHOD FOR PRODUCING THE SAME

(71) Applicant: Tridelta Meidensha GMBH, Hermsdorf (DE)

(72) Inventors: Thomas Paalhorn, Schleiz (DE); Philipp Raschke, Weibenborn (DE); Stephan Hilmer, Hermsdorf (DE)

(73) Assignee: Tridelta Meidensha GMBH, Hermsdorf (DE)

( * ) Notice: Subject to any disclaimer, the term of this patent is extended or adjusted under 35 U.S.C. 154(b) by 0 days.

(21) Appl. No.: 17/551,443

(22) Filed: Dec. 15, 2021

(65) Prior Publication Data

US 2022/0189667 A1 Jun. 16, 2022

(30) Foreign Application Priority Data

Dec. 16, 2020 (DE) ......................... 102020133830.9

(51) Int. Cl.
*H01C 7/12* (2006.01)

(52) U.S. Cl.
CPC .................................... *H01C 7/126* (2013.01)

(58) Field of Classification Search
CPC ...................................................... H01C 7/126
See application file for complete search history.

(56) References Cited

U.S. PATENT DOCUMENTS 5,043,838 A * 8/1991 Sakich .................. H01C 7/126 338/21
5,050,032 A * 9/1991 Thevenet ................ H01C 7/12 361/127
5,138,517 A * 8/1992 Raudabaugh ............ H01C 7/12 361/127
6,008,975 A * 12/1999 Kester .................... H01C 7/102 361/111
10,446,296 B2 * 10/2019 Roggow ................ H01C 7/126
2012/0086541 A1 * 4/2012 Kester ...................... H01C 7/12 338/21

FOREIGN PATENT DOCUMENTS

EP 2748224 B1 7/2017

OTHER PUBLICATIONS

German Office action in corresponding German application No. 10 2020 133 830.9 dated Sep. 14, 2021. (5 pages).

* cited by examiner

*Primary Examiner* — Kyung S Lee

(57) ABSTRACT

The invention relates to a surge arrester comprising two opposing end fittings 3, one or more varistors 5 arranged between the end fittings 3, a winding layer 9 provided at least on the at least one varistor 5, wherein the winding layer 9 is a closed layer 9, and a reinforcement element 7 which extends between the end fittings 3 and keeps the end fittings 3 under tension, wherein the reinforcement element 7 is an open cross winding 13. Moreover, the invention relates to a method for producing this surge arrester.

20 Claims, 2 Drawing Sheets

SURGE ARRESTER WITH A WINDING DESIGN, AND METHOD FOR PRODUCING THE SAME

CROSS REFERENCE TO RELATED APPLICATIONS

The present application claims foreign priority benefits filed under 35 U.S.C. § 119(a)-(d) claiming priority to currently pending German Patent Application Serial Number 102020133830.9 having a filing date of Dec. 16, 2020 entitled SURGE ARRESTER WITH A WINDING DESIGN, AND METHOD FOR PRODUCING THE SAME. The above-identified application from which priority is claimed is herein incorporated by reference in its entirety for all purposes.

The invention relates to a surge arrester with a winding design and to a method for producing the same. In particular, the invention relates to a surge arrester comprising an open cross winding made of fibreglass-reinforced plastic.

Details regarding surge arresters and especially regarding the selection and the design of their housings are known, for example, from "Metalloxid-Ableiter in Hochspannungsnetzen", Volker Hinrichsen, 3rd edition, publisher and copyright ©2012: Siemens AG Energy Sector Freyeslebenstraße 1 91058 Erlangen, Germany (https://cache.industry.siemens.com/dl/files/132/109747132/att_918329/v1/Metalloxid-Ableiter_in_Hochspannungsnetzen_-_Grundlagen.pdf).

As explained therein, in the case of a short circuit in surge arresters with a plastic housing there generally is no defined pressure build-up in the housing, which pressure could actuate a pressure release device—as is known from porcelain arresters—instead, the arising arc finds its way directly through a housing wall of the plastic housing to arbitrary points or points specifically designed to this end.

In the case of such an arrester overload, it is necessary to ensure that either the plastic housing does not even break or housing fragments and ejected parts fall to the ground within an area around the surge arrester, the size of which area is defined on the basis of the surge arrester height.

Only parts that are respectively below a given weight limit, for example a weight of 60 g, may also be found outside of the area.

Three basic types of plastic housings have become established in practice. Firstly, those with an enclosed gas volume in the so-called tube design, secondly those with a bar cage made of fibreglass-reinforced plastic bars which run parallel to a stack of varistors—preferably metal oxide varistors—and which are fastened to two end fittings or terminals—preferably made of aluminium—and which are surrounded without a gas volume by a cast silicone housing (cage design), and finally those with a winding made of fibreglass threads ("winding design"), which is often applied to the varistors as a so-called prepreg.

A problem of the known surge arresters with the winding design is that they require a certain thickness of the winding in order to reach the required mechanical strength, but this thickness is an impediment in the case of a short circuit since pressure can then build up in the interior of the winding which could lead to fragments of the varistors possibly being flung further out than admissible in the case of a sudden pressure release when the housing breaks.

To respond to this problem, open windings have been proposed in the past, for example as shown in U.S. Pat. No. 5,043,838. In this case, the winding does not form an enclosed space but a multiplicity of rhombic open regions without winding remain, which are distributed more or less regularly over the entire surface of the varistors, with only the outer silicone housing separating the varistors from the external environment in these regions. This construction reliably prevents the build-up of pressure in the interior and nevertheless facilitates good mechanical strength. If the rhombic open regions without winding are sufficiently small, it is also possible to prevent relatively large fragments of the varistors from reaching the outside.

Since surge arresters usually are in operation for many years and are exposed to environmental influences in the process, for example rain, fog—including salty coastal fog—and extreme temperature variations, the long-term behaviour of these surge arresters, in particular, is important. In the process, it was found that the usual plastic housings, preferably silicone housings, are insufficient under certain circumstances for preventing an ingress of water, the latter then collecting at the surface of the varistors, with preference in the open regions, and even creeping under the winding in the case of a lacking adhesion of the winding to the varistors. This causes increased power loss and leads to the failure of the surge arrester.

It is therefore the object of the invention to provide a surge arrester of the aforementioned type, which has excellent low power loss, even in the long term, and which permits a reliable and safe operation.

The object is achieved by a surge arrester according to the appended claims and by the method, explained there, for producing the same.

In accordance with the invention a surge arrester is provided, comprising two opposing end fittings, one or more varistors arranged between the end fittings, a winding layer provided at least on the at least one varistor, wherein the winding layer is an at least partly closed layer, and a reinforcement element which extends between the end fittings and keeps the end fittings under tension, wherein the reinforcement element is an open cross winding.

Preferably, a cationically crosslinking epoxy resin is used in the surge arrester as a resin for a resin-impregnated fibreglass thread to be used for the windings, or for the fibreglass thread bundle or roving.

Further preferably, the cationically crosslinking epoxy resin contains a UV initiator and/or a thermal initiator.

In particular, it is preferable for the cationically crosslinking epoxy resin to adhere to the surface of the at least one varistor.

In a preferred embodiment, the reinforcement element has a cross section 5 to 10-times, preferably 7-times thicker than the winding layer.

The surge arrester according to the invention preferably has a silicone outer housing.

It is also preferable for the cross winding to leave open rhombic areas between the resin-impregnated fibreglass threads, with the angles of these rhombic areas being between 20 and 160°.

According to the invention, a production method for the above-described surge arrester is moreover provided, including the steps of: providing a stack with two opposing end fittings and at least one varistor arranged therebetween; wrapping the stack with a resin-impregnated fibreglass thread to form an at least partly closed winding layer, and partially axially wrapping the stack to form an open cross winding by way of the relative rotation of the stack with a simultaneous back and forth movement in the longitudinal direction while the resin-impregnated fibreglass thread is supplied.

Below, the invention is described on the basis of a preferred embodiment, with reference being made to the appended figures, in which.

Figure 1:
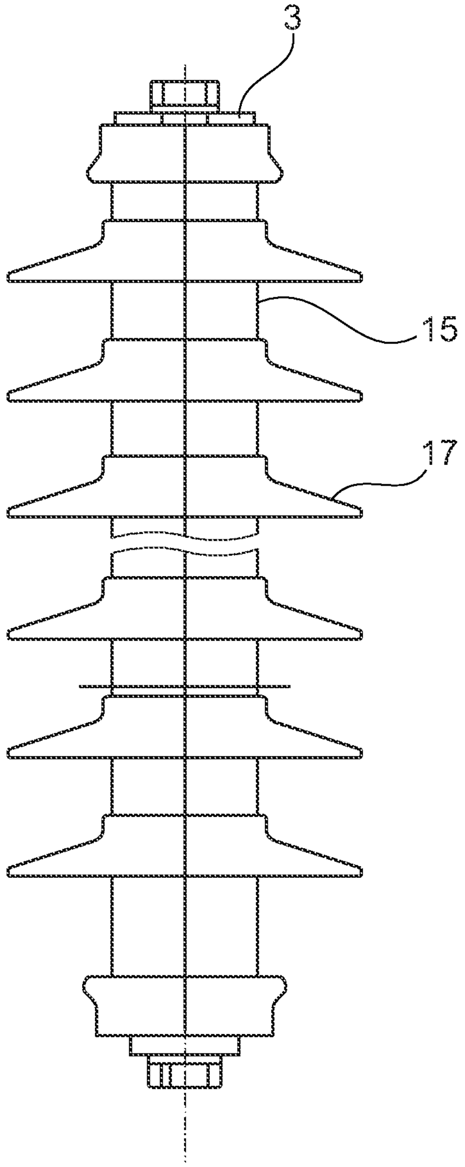
FIG. 1 shows a view of a surge arrester according to the invention.

As shown in FIG. 1, the surge arrester according to the invention has a plastic outer housing 15, preferably a silicone outer housing, which forms a plurality of shields 17 in order to lengthen a creepage path for a current and in order to avoid a continuous electrically conductive connection between the two ends of the surge arrester via adhering water or contaminants.

The surge arrester shown has two opposing end fittings or terminals 3, which are preferably manufactured from aluminium, and one or more varistors 5, preferably made of metal oxide, especially made of zinc oxide, which are stacked between the two terminals 3.

These varistors 5 have the property of being very good insulators below a threshold voltage, but they change their electrical resistance nonlinearly but reversibly to a small value once the threshold voltage is reached such that a surge at one end of the surge arrester can be reduced by an appropriate current through the surge arrester. In this way, earth-connected surge arresters protect other electrical components of a power grid from surges.

However, there may be an overload of the surge arrester—as described at the outset—in the case of a very high current through the surge arrester—for instance in the case of a lightning strike close to the arrester. In this case, an ionized gas forms in the surge arrester, in which an arc can subsequently be formed. High temperatures arise in the process and, should no suitable countermeasures be implemented, high pressures may also arise and lead to the surge arrester bursting.

The surge arrester shown in FIG. 1 contains a module 19 below the plastic housing 15, the module having the described stack of the one or more varistors 5, the two end fittings 3 and a reinforcement element 9, as shown in more detail in FIGS. 2 and 3.

In this case, the reinforcement element 9 is formed as an open cross winding 13.

To produce this cross winding 13, a fibreglass thread—preferably a fibreglass thread bundle—is guided through a resin bath and impregnated with the resin. This resin-impregnated fibreglass thread is then wound around the stack of the one or more varistors 5 and the two end fittings 3. To this end, one end of the fibreglass thread is preferably fastened to the stack and this stack is then rotated about its longitudinal axis while the stack is simultaneously moved along its longitudinal axis relative to a supply point of the fibreglass thread.

To the extent that this application refers to a fibreglass thread, this should always also be understood to mean a fibreglass thread bundle or roving.

Whenever the fibreglass thread reaches one of the ends of the stack as a consequence of the movement of the stack along the longitudinal axis, the direction of the movement of the stack along the longitudinal axis is reversed and the fibreglass thread is guided over a shoulder of the respective end fitting while the rotation of the stack about its longitudinal axis is continued.

Figure 2:
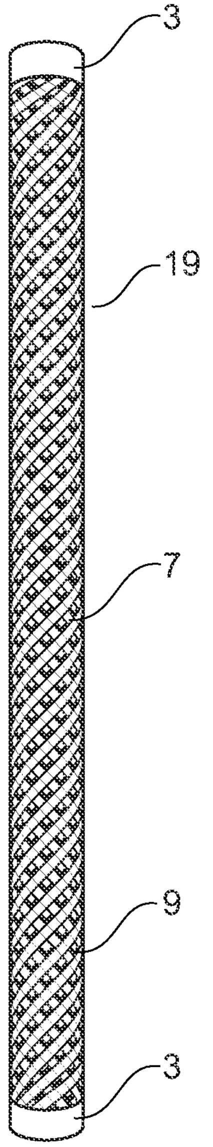
FIG. 2 shows the surge arrester from FIG. 1 without a silicone housing.
Figure 3:
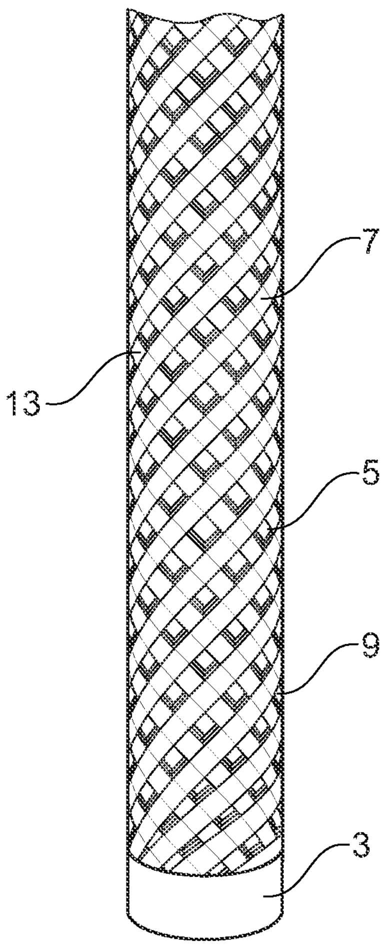
FIG. 3 shows a detailed view of the surge arrester from FIG. 2.

By virtue of the speeds of these two movements being matched to one another it is possible to form an open cross winding as shown in FIGS. 2 and 3. In so doing, it is also possible to work with an offset at the end fittings. That is to say, the movement in the direction of the longitudinal axis stops when the fibreglass thread reaches the end fitting 3 but the stack is rotated on through a predetermined angle. Subsequently, the movement in the direction of the longitudinal axis restarts, but with an opposite sign such that the fibreglass thread is placed on a track formed during a preceding iteration.

In this production process, which is also referred to as filament winding method, the fibreglass thread runs through the resin bath and then over a rotation of a spindle in which the at least one varistor 5 and the end fittings 3 are clamped, wherein the fibreglass thread is applied such that a cross pattern arises by way of an additional translational movement of an installation carriage in the direction of the longitudinal axis of the stack. The exact positioning of the layers above one another and the angles of the winding arise from mathematical relationships in the winding program. In this case, an open cross winding is used in a targeted manner since gas arising in the surge arrester in the case of a short circuit can consequently escape easily and the arising arc quickly reaches out of the housing 15 from the varistor 5.

Since the fibreglass thread includes an angle from 10 to 89°, preferably 30 to 70° and particularly preferably 45° with respect to the longitudinal axis of the stack, the fibreglass thread is able to hold the two end armatures 3 and the at least one varistor 5 securely and under tension. In this case, the open cross winding can withstand both axial forces parallel to the longitudinal axis and also bending forces and torsion forces, and hence it can ensure a high mechanical strength of the stack.

In a preferred embodiment, a plurality of parallel fibreglass threads are used simultaneously as a so-called roving, for example with a tex number of 2400.

In the cross winding 13 shown in FIGS. 2 and 3, 7 layers of such rovings are arranged above one another in each case so that a cross-sectional thickness of the winding of 2 to 10 mm arises. The cross-sectional thickness can be set depending on the desired mechanical strength. A greater cross-sectional thickness increases the mechanical strength but then also requires more silicone for forming the plastic housing 15 and more material for forming the reinforcement elements, making the surge arrester more expensive.

According to the invention, a cationically crosslinking epoxy resin is used to impregnate the fibreglass thread. Examples of such a resin include Vitralit® adhesives and potting compounds from Panacol-Elosol GmbH. These are single component systems based on acrylate or an epoxy resin, which cure within a very short time under UV or visible light and can be thermally post-cured depending on requirements. Depending on the application, curing times of 0.5 to 60 seconds can be achieved by way of high-energy irradiation. As a result of thermal post-curing, the adhesive can also be cured in shadow zones following the curing by light.

In particular, it is preferable for the cationically crosslinking epoxy resin to contain a UV initiator and/or thermal initiator in order to bring about curing either by way of UV irradiation or by way of heat.

In the preferred embodiment, as shown in more detail in FIG. 3, an additional purely radial winding is provided in the region of the end fittings 3 in order to facilitate a fixed mechanically stable connection between the open cross winding 13 and the end fittings 3 and to provide a seal against water.

As described at the outset, it is decisive for the practical use of the surge arrester that it maintains its electrical properties even over a relatively long time and in changing environmental conditions. In this context, there is in particular the risk of water diffusing through the plastic housing 15 and collecting in the open sites of the cross winding 13 at the surface of the at least one varistor 5. This increases the power loss of the surge arrester.

To respond to this problem a substantially single-layer winding 9 of the resin-impregnated fibreglass thread is provided according to the invention between the open cross winding 13 and the at least one varistor 5 such that a closed layer forms on the entire outer surface of the at least one varistor 5. The cationically crosslinking epoxy resin acts as an adhesive and provides good adherence on the surface of the at least one varistor 5.

To form this layer, which is formed as a winding layer 9, the resin-impregnated fibreglass thread or the roving is wound substantially radially about the stack after having been fastened to the stack to be wrapped, that is to say wound with such a low relative movement of the stack in the direction of the longitudinal axis relative to the rotational speed of the stack about its longitudinal axis that only an offset of the winding which equals to or is minimally smaller than the width of the fibreglass thread or of the roving is formed per rotation.

The thickness of this layer in the cross section is preferably 0.1 to 0.5 mm, without being restricted thereto.

It is also possible to use a closed cross winding instead of a substantially radial winding. That is to say the winding is carried out with a greater movement speed in the direction of the longitudinal axis, but in return the movement direction is reversed when one of the end fittings 3 is reached, like in the case of the open cross winding. This time, the rotational speed and the movement speed in the direction of the longitudinal axis are chosen in such a way in this case that the fibreglass threads are laid with an offset next to one another or with a small overlap—and a closed layer is formed in this manner. However, on account of the crossing fibreglass threads the thickness of this layer varies in more pronounced fashion than that of the substantially radial winding. However, it should be observed in this case that, firstly, a closed layer arises and that the latter is a "single layer" to a large extent.

On account of the utilized resin, the layer formed in the manner described above adheres well to the surface of the at least one varistor 5. On account of the low thickness and optionally the radial alignment of the fibreglass thread, this layer however provides no notable contribution to the mechanical stability.

The epoxy resin forms a layer with a very significant water tightness, and so it is possible to prevent water from collecting at the surface of the at least one varistor 5. In this respect, the winding layer acts as a shielding layer against moisture.

To therefore simultaneously obtain pressure relief in the case of a short circuit and a sealing of the interior varistors, the thin layer 9 below the open cross winding 7 is wound "radially" or as a "closed cross winding". Firstly, it is weak enough to open like a membrane in the case of a short circuit. Secondly, significantly improved tightness is provided if use is made of a very water-impermeable resin.

Curing by means of UV irradiation facilitates fully hardening directly at a machine for forming the winding after applying the windings. Then, the module 19 can be removed in dimensionally stable fashion and can be post-cured in the oven such that even the regions remaining in the shadow of the UV irradiation are cured.

The cationically crosslinking epoxy resin with UV initiator and thermal initiator preferably used in this context adheres very well to the surface of the at least one varistor 5. Expressed differently, a particular strength of the resin also lies in its property of acting more as an adhesive than as a resin. This prevents a collection of moisture on the surface of the varistor 5 and moreover has a greatly decelerated intake of water (vapour).

In the case of a short circuit, the low thickness of the closed layer 9 does not represent a pressure-resistant barrier to the arising plasma—despite also using the fibreglass thread—and so an internal pressure build-up is avoided.

This could be confirmed in a series of tests, in which surge arresters with an open cross winding, surge arresters with an open cross winding and a closed layer therebelow, and surge arresters with a completely closed cross winding were produced and subjected to a product-typical water storage test (boiling test, wherein the surge arrester is placed in simmering brine for a predetermined period of time) and to the short circuit examination. The surge arresters with an open cross winding but without a closed layer passed the short circuit test but not the water storage test. The surge arresters with a closed cross winding passed the water storage test but not the short circuit test. Surge arresters with open cross winding and a closed layer therebelow passed both examinations.

It was found that the surge arresters with the closed layer 9 had a significantly better behaviour and less impairment by the water storage test or boiling test.

Even though the invention was described in detail above on the basis of an example, it is not restricted thereto. It is preferable for the application of the closed layer 9 to be implemented by the same winding apparatus as for the open cross winding 7 provided on said closed layer, simply by way of changing the movement speed in the direction of the longitudinal axis and/or the rotational speed and/or an offset at the end fitting 3 after the application of the closed layer 9. However, the two windings can also be implemented in different machines and it is possible to cure the closed layer by UV radiation or thermally before the open cross winding 13 is applied.

A further alternative consists of providing the radial winding for sealing purposes only in the transition regions between an end terminal and the varistor 5 or between two varistors 5 of the stack. This can be achieved by virtue of the fibreglass thread being guided substantially parallel to the longitudinal axis of the stack until a transition region is reached when the winding layer is wrapped, subsequently the longitudinal movement being substantially stopped and only a rotation of the stack being carried out until the transition region is covered by the winding layer, and subsequently the longitudinal movement being restarted until the next transition region. In this case, care has to be taken that the adhesive effect of the resin on the surface of the varistor sufficient to hold the already applied fibreglass thread when the movement direction is changed.

Although this only achieves a sealing of the transition regions, this already also has a positive effect on the water storage test or boiling test.

What is claimed is:

1. Surge arrester comprising:

two opposing end fittings (3);

a stack of one or more varistors (5) arranged between the end fittings;

a winding layer (9) provided at least on the at least one varistor (5), wherein the winding layer (9) is an at least partly closed winding layer (9) formed by wrapping the stack with a resin-impregnated fiberglass thread; and a reinforcement element (7) which extends between the end fittings (3) and keeps the end fittings (3) under tension, wherein the reinforcement element (7) is an open cross winding (13).

2. Surge arrester according to claim 1, wherein the open cross winding comprises a resin for the resin-impregnated fibreglass thread, the resin being a cationically crosslinking epoxy resin.

3. Surge arrester according to claim 2, wherein the cationically crosslinking epoxy resin contains at least one of a UV initiator and a thermal initiator.

4. Surge arrester according to claim 2, wherein the cationically crosslinking epoxy resin adheres to the surface of the at least one varistor (5).

5. Surge arrester according to claim 1, wherein the reinforcement element (7) has a cross section 5 to 10-times thicker than the winding layer (9).

6. Surge arrester according to claim 1, wherein the surge arrester has a silicone outer housing (15).

7. Surge arrester according to claim 2, wherein open rhombic areas remain between the resin-impregnated fibreglass threads in the cross winding, with the angles of these rhombi being between 20 and 160°.

8. Surge arrester according to claim 1, wherein the winding layer is a closed layer, at least in transition regions between an end fitting (3) and a varistor (5) of the at least one varistors and in transition regions between the at least one varistors (5).

9. Surge arrester according to claim 1, wherein the winding layer is a continuously closed layer, which covers an entire outer surface of the at least one varistor (5).

10. Method for producing a surge arrester, including the steps of:

providing a stack with two opposing end fittings and at least one varistor arranged therebetween;

wrapping the stack with a resin-impregnated fibreglass thread to form an at least partly closed winding layer; and partially axially wrapping the stack to form an open cross winding by way of the relative rotation of the stack with a simultaneous back and forth movement in the longitudinal direction while the resin-impregnated fibreglass thread is supplied.

11. Surge arrester according to claim 2, wherein the winding layer is a continuously closed layer, which covers an entire outer surface of the at least one varistor (5).

12. Surge arrester according to claim 3, wherein the cationically crosslinking epoxy resin adheres to the surface of a varistor (5) of the at least one varistors.

13. Surge arrester according to claim 2, wherein the reinforcement element (7) has a cross section 5 to 10-times thicker than the winding layer (9).

14. Surge arrester according to claim 1, wherein the reinforcement element (7) has a cross section 7-times thicker than the winding layer (9).

15. Surge arrester according to claim 2, wherein the surge arrester has a silicone outer housing (15).

16. Surge arrester according to claim 4, wherein the surge arrester has a silicone outer housing (15).

17. Surge arrester according to claim 4, wherein open rhombic areas remain between the resin-impregnated fibreglass threads in the cross winding, with the angles of these rhombi being between 20 and 160°.

18. Surge arrester according to claim 5, wherein open rhombic areas remain between the resin-impregnated fibreglass threads in the cross winding, with the angles of these rhombi being between 20 and 160°.

19. Surge arrester according to claim 2, wherein the winding layer is a closed layer, at least in transition regions between an end fitting (3) and a varistor (5) and in transition regions between varistors (5).

20. Surge arrester according to claim 1, wherein the winding layer is a continuously closed layer, which covers an entire outer surface of the at least one varistor (5).

* * * * *